United States Patent
Nakamura et al.

(10) Patent No.: US 12,184,154 B2
(45) Date of Patent: Dec. 31, 2024

(54) DRIVE DEVICE AND VEHICLE

(71) Applicant: NIDEC CORPORATION, Kyoto (JP)

(72) Inventors: Keigo Nakamura, Kyoto (JP); LiPeng Li, Kyoto (JP); Takashi Shiraishi, Kyoto (JP); Yoshiyuki Aono, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 254 days.

(21) Appl. No.: 17/852,396

(22) Filed: Jun. 29, 2022

(65) Prior Publication Data

US 2023/0006507 A1    Jan. 5, 2023

(30) Foreign Application Priority Data

Jun. 30, 2021  (JP) ................................ 2021-108485

(51) Int. Cl.
*H02K 7/08* (2006.01)
*H02K 5/16* (2006.01)
*H02K 7/00* (2006.01)

(52) U.S. Cl.
CPC ................ *H02K 7/08* (2013.01); *H02K 5/16* (2013.01); *H02K 7/003* (2013.01)

(58) Field of Classification Search
CPC ........ H02K 11/30; H02K 5/225; H02K 5/203; H02K 1/32; H02K 5/22; H02K 7/116; H02K 9/193; H02K 11/33; H02K 5/20; H02K 9/19; B60L 50/51; B60K 17/04; H02M 7/48
See application file for complete search history.

(56) References Cited

U.S. PATENT DOCUMENTS

| | | | |
|---|---|---|---|
| 7,193,836 B2 | 3/2007 | Oh et al. | |
| 11,088,582 B2 | 8/2021 | Graves et al. | |
| 11,121,608 B2 | 9/2021 | Huber et al. | |
| 2006/0194666 A1* | 8/2006 | Zimmermann | F16H 1/125 74/421 A |
| 2013/0057096 A1 | 3/2013 | Okada et al. | |
| 2018/0083515 A1* | 3/2018 | Graves | H02K 9/193 |
| 2019/0173344 A1* | 6/2019 | Ishikawa | H02K 1/32 |

FOREIGN PATENT DOCUMENTS

| | | | |
|---|---|---|---|
| CN | 108173386 A | | 6/2018 |
| JP | 2000316251 A | * | 11/2000 |
| JP | 2001157394 A | | 6/2001 |

(Continued)

OTHER PUBLICATIONS

JP-2000316251-A machine translation May 4, 2024.*

(Continued)

*Primary Examiner* — Leda T Pham
(74) *Attorney, Agent, or Firm* — HAUPTMAN HAM, LLP (57) ABSTRACT

A drive device includes a first bearing lubricated by a fluid and a second bearing lubricated by a lubricant having a higher electrical conductivity than the fluid. The first bearing rotatably supports a shaft extending in the axial direction along the rotation axis. A housing of the drive device has a first bearing holder that holds the first bearing. The second bearing is arranged between the shaft and the housing and rotatably supports the shaft. The second bearing is arranged in a space isolated from the first bearing holder.

16 Claims, 6 Drawing Sheets

(56) References Cited

FOREIGN PATENT DOCUMENTS

JP           20104695 A     1/2010
JP         2019192491 A    10/2019

OTHER PUBLICATIONS

Makino et al.; "Motor and Drive Device"; U.S. Appl. No. 17/848,396, filed Jun. 24, 2022, 74pp.
Makino et al.; "Motor"; U.S. Appl. No. 17/676,819, filed Feb. 22, 2022, 73pp.
Shimogai et al.; "Drive Device and Vehicle"; U.S. Appl. No. 17/851,042, filed Jun. 28, 2022, 60pp.
Shiraishi et al.; "Drive Device and Vehicle"; U.S. Appl. No. 17/852,367, filed Jun. 29, 2022, 66pp.

\* cited by examiner

DRIVE DEVICE AND VEHICLE

CROSS-REFERENCE TO RELATED APPLICATIONS

The present invention claims priority under 35 U.S.C. § 119 to Japanese Patent Application No. 2021-108485 filed on Jun. 30, 2021, the entire content of which is incorporated herein by reference.

FIELD OF THE INVENTION

The present invention relates to a drive device and a vehicle.

BACKGROUND

Conventionally, a drive device having a neutralizing mechanism on a shaft of a motor portion has been known. For example, a rotating shaft of a rotary electric machine is supported by a main bearing and an auxiliary bearing. The auxiliary bearing is filled with conductive grease. As a result, an electric charge when a shaft voltage of the rotating shaft is about to increase flows to an outer frame by the conductive grease of the auxiliary bearing, and does not flow to the main bearing.

However, when foreign matter adheres to the bearing as described above, there is a possibility that the electric charge hardly flows to a housing such as the outer frame. For example, in an in-vehicle motor, a lubricating oil, a refrigerant for cooling a motor portion, and the like circulate. There is a possibility that these are mixed with a lubricant to increase electric resistance of the lubricant when adhering to the above-described bearing having the lubricant. Therefore, there is a possibility that it is difficult to maintain favorable electrical conduction between the shaft and the housing.

SUMMARY

An exemplary drive device of the present invention includes a shaft, a rotor, a stator, a first bearing, a housing, and a second bearing. The shaft extends in an axial direction along a rotation axis. The rotor is fixed to the shaft and is rotatable about the rotation axis. The stator radially faces the rotor with a gap interposed therebetween. The first bearing rotatably supports the shaft and is lubricated by a fluid. The housing includes a first bearing holder that holds the first bearing, and accommodates the rotor and the stator. The second bearing is arranged between the shaft and the housing, rotatably supports the shaft, and is lubricated by a lubricant having a higher electrical conductivity than the fluid. The second bearing is arranged in a space isolated from the first bearing holder.

An exemplary vehicle of the present invention includes the drive device described above.

The above and other elements, features, steps, characteristics and advantages of the present disclosure will become more apparent from the following detailed description of the preferred embodiments with reference to the attached drawings.

DETAILED DESCRIPTION

Hereinafter, an exemplary preferred embodiment will be described with reference to the drawings.

Figure 1:
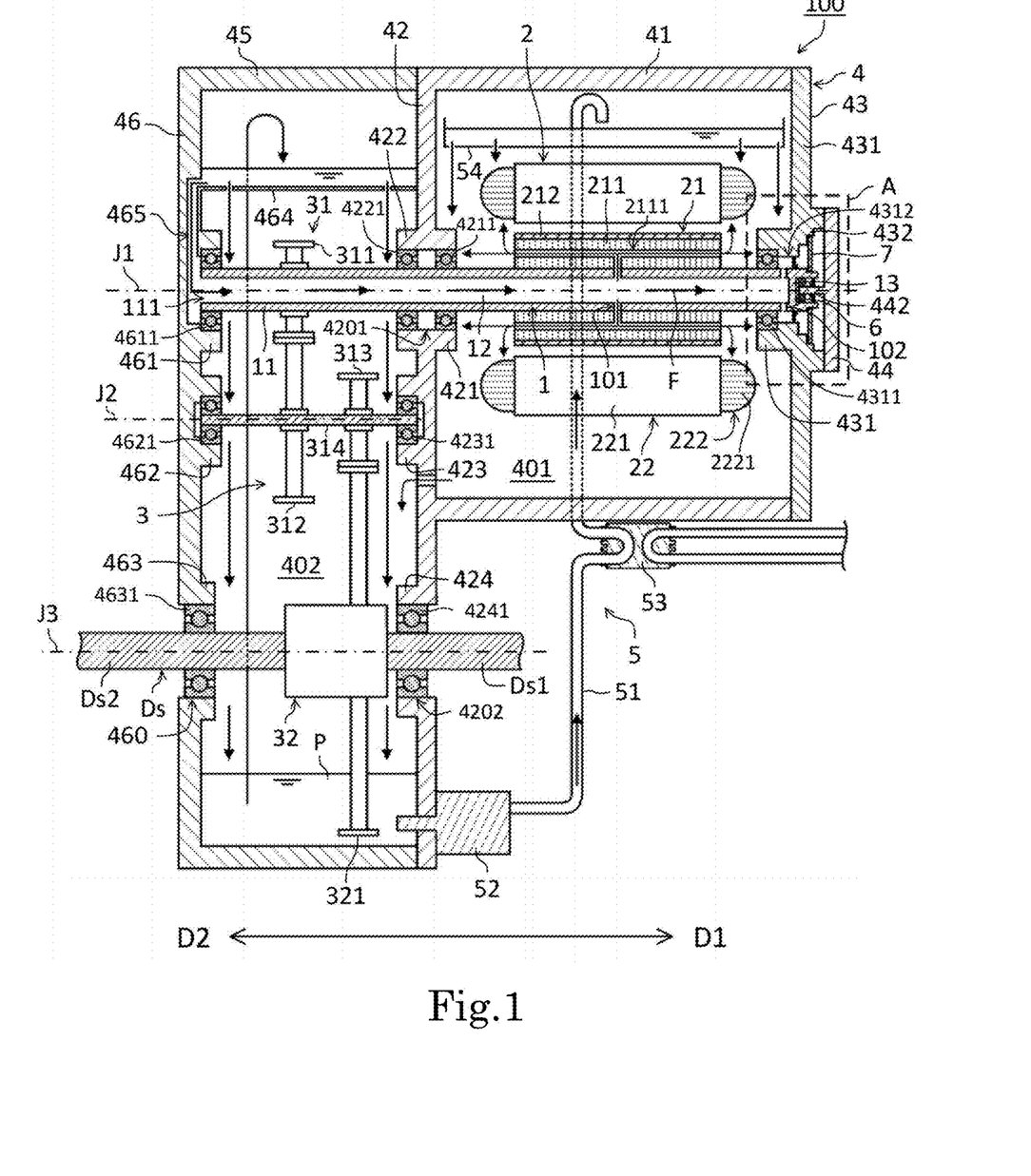
FIG. 1 is a conceptual diagram illustrating a configuration example of a drive device.

In the present specification, a direction parallel to a rotation axis J1 of a motor portion 2 is referred to as an "axial direction" of a drive device 100. In the axial direction, as illustrated in FIG. 1, a motor portion 2 side is defined as one axial side D1, and a gear portion 3 side is defined as the other axial side D2. In addition, a radial direction orthogonal to a predetermined axis, such as the rotation axis J1, is simply referred to as a "radial direction", and a circumferential direction around the predetermined axis, such as the rotation axis J1, is simply referred to as a "circumferential direction".

In the present specification, in the positional relationship between any one of orientations, lines, and surfaces and another one, the term "parallel" means not only a state where both never cross each other no matter how long they extend, but also a state where both are substantially parallel. In addition, the term "perpendicular" includes not only a state where both intersect each other at 90 degrees, but also a state where both are substantially perpendicular. That is, the terms "parallel" and "perpendicular" each include a state where the positional relationship between both permits an angular deviation to a degree that does not depart from the gist of the present invention.

In the present specification, the term "extending" in a predetermined direction includes a configuration in which an extending direction is substantially the predetermined direction in addition to a configuration in which the extending direction is strictly the predetermined direction. That is, the term "extending" in the predetermined direction includes a configuration in which there is a directional deviation from the predetermined direction to an extent that does not depart from the gist of the present invention. The same applies to the term "expanding" in a predetermined direction.

Figure 2:
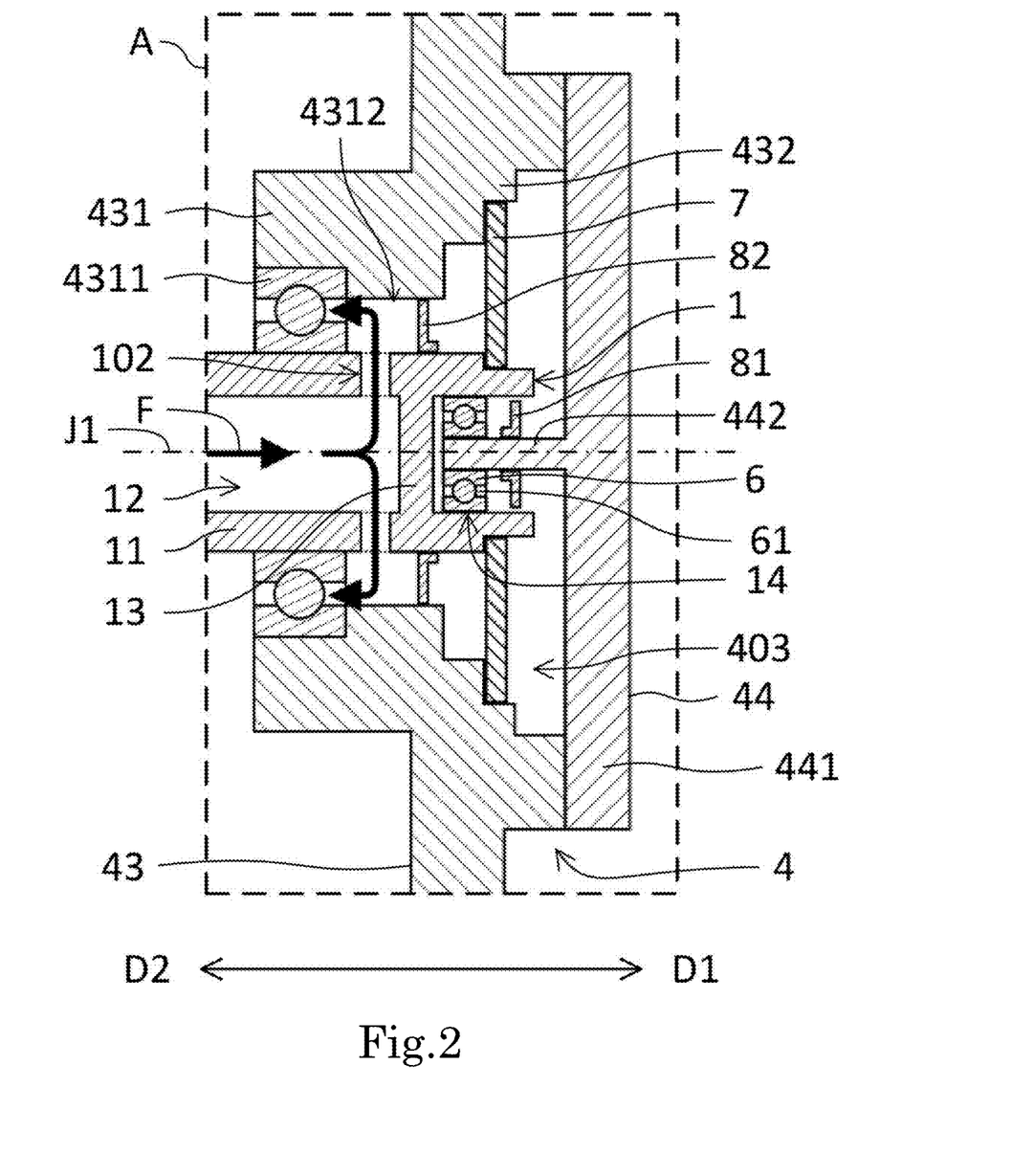
FIG. 2 is a conceptual diagram illustrating an example of a shaft neutralizing structure of the drive device according to an preferred embodiment.
Figure 3:
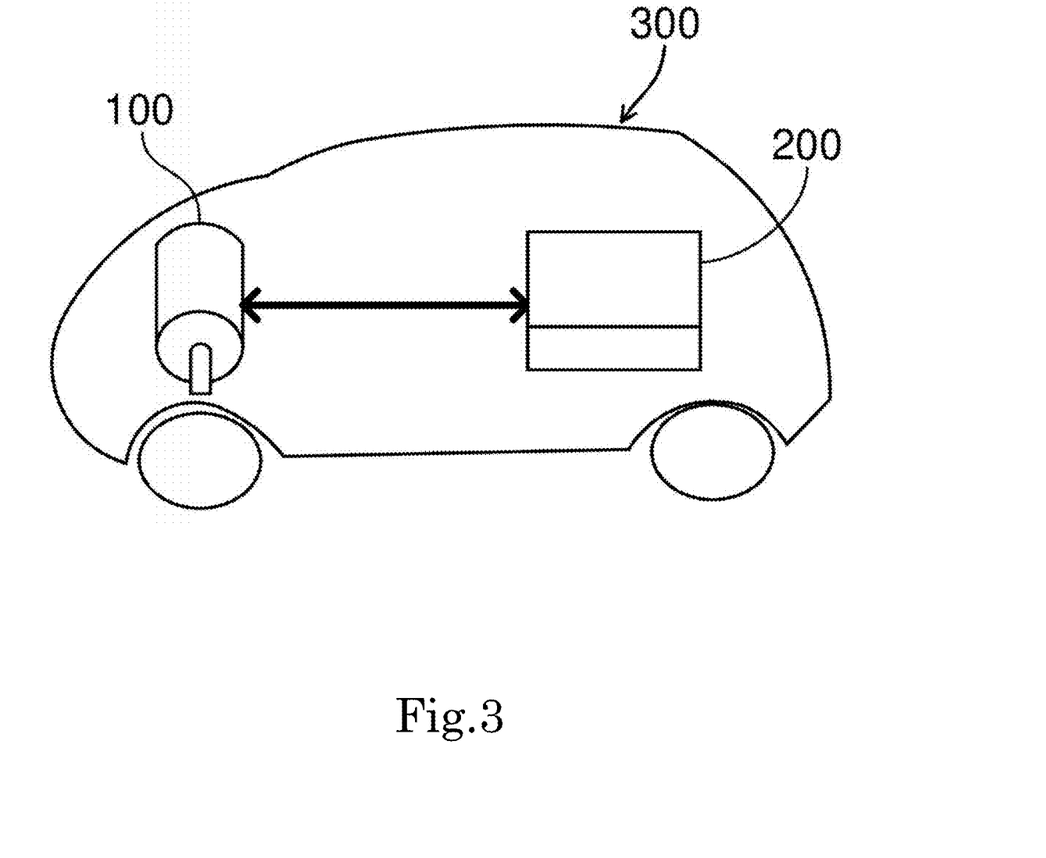
FIG. 3 is a schematic diagram illustrating an example of a vehicle having the drive device mounted thereon.

FIG. 1 is a conceptual diagram illustrating a configuration example of the drive device 100. FIG. 2 is a conceptual diagram illustrating an example of a shaft neutralizing structure of the drive device 100 according to the preferred embodiment. FIG. 3 is a schematic diagram illustrating an example of a vehicle 300 having the drive device 100 mounted thereon. Note that FIGS. 1 and 2 are merely conceptual diagrams, and a layout and a dimension of each portion are not necessarily identical to those of the actual drive device 100 in a strict sense. In addition, FIG. 2 is an enlarged view of a portion A surrounded by a broken line in FIG. 1. In addition, FIG. 3 conceptually illustrates the vehicle 300.

In the present preferred embodiment, the drive device 100 is mounted on the vehicle 300 such as a hybrid vehicle (HV), a plug-in hybrid vehicle (PHV), or an electric vehicle (EV) in which at least the motor is used as a power source as illustrated in FIG. 3. The drive device 100 is used as the power source of the above-described vehicle 300. The vehicle 300 has the drive device 100. Since the drive device 100 is installed, the drive device 100 of the vehicle 300 including a neutralizing mechanism between a shaft 1 and a housing 4 can be downsized. In FIG. 3, the drive device 100 drives front wheels of the vehicle 300. Note that, the drive device 100 may drive at least any of the wheels. In addition, the vehicle 300 further includes a battery 200. The battery 200 stores electric power to be supplied to the drive device 100.

As illustrated in FIG. 1, the drive device 100 includes the shaft 1, the motor portion 2, the gear portion 3, the housing 4, a liquid circulation portion 5, a conductive bearing 6, a rotation detector 7, a first seal member 81, and a second seal member 82.

The shaft 1 axially extends along the rotation axis J1. As described above, the drive device 100 includes the shaft 1. The shaft 1 is rotatable about the rotation axis J1. As illustrated in FIG. 1, the shaft 1 is rotatably supported by the housing 4 via a first motor bearing 4211, a second motor bearing 4221, a third motor bearing 4311, and a fourth motor bearing 4611 to be described later. That is, the drive device 100 includes these bearings 4211, 4221, 4311, and 4611. These bearings 4211, 4221, 4311, and 4611 rotatably support the shaft 1.

The shaft 1 has a tubular shape extending in the axial direction. A fluid F flows inside the shaft 1. The drive device 100 further includes this fluid F. Note that the fluid F is a lubricant that lubricates the gear portion 3 and the bearings of the drive device 100, and is, for example, an automatic transmission fluid (ATF) in the present preferred embodiment. In addition, the fluid F is used as a refrigerant for cooling the motor portion 2 and the like. As the shaft 1 rotates, the fluid F flowing inside the shaft 1 can be supplied to the motor portion 2, the first motor bearing 4211, the third motor bearing 4311, and the like through a first shaft through-hole 101 to be described later. Therefore, a stator 22 (particularly, a coil end 2221 to be described later), the above-described bearings 4211 and 4311, and the like can be cooled by the fluid F.

Note that the shaft 1 may be dividable, for example, at an intermediate portion in the axial direction. When the shaft 1 is dividable, the divided shafts 1 are connected by spline fitting, for example. Alternatively, the divided shafts 1 may be connected by screw coupling using a male screw and a female screw, or may be joined by a fixing method such as press-fitting and welding. When the fixing method such as press-fitting or welding is adopted, serrations combining recesses and protrusions extending in the axial direction may be adopted. With such a configuration, it is possible to reliably transmit the rotation.

The shaft 1 includes a shaft tubular portion 11 having a tubular shape surrounding the rotation axis J1. The shaft tubular portion 11 has a tubular shape and extends in the axial direction along the rotation axis J1. The shaft tubular portion 11 is rotatably supported by the third motor bearing 4311. In addition, the shaft tubular portion 11 is also rotatably supported by the first motor bearing 4211, the second motor bearing 4221, the fourth motor bearing 4611, and the conductive bearing 6. The shaft tubular portion 11 has conductivity, and is made of metal in the present preferred embodiment. In addition, the shaft 1 includes a hollow portion 12 and an inlet 111. The hollow portion 12 is a space surrounded by an inner peripheral surface of the shaft tubular portion 11, and is arranged inside the shaft tubular portion 11. The inlet 111 is the other axial end portion of the shaft tubular portion 11 having the tubular shape, and is connected to a flow passage 465 of a gear lid 46 to be described later. The fluid F flows from the flow passage 465 into the hollow portion 12 through the inlet 111.

Next, the shaft 1 further includes a shaft wall 13. The shaft wall 13 is arranged inside the shaft tubular portion 11 and expands in the radial direction. The shaft wall 13 is arranged on the one axial side D1 of the shaft tubular portion 11. In addition, the other axial end portion of the shaft wall 13 is arranged on the other axial side D2 of the rotation detector 7 in the present preferred embodiment. A radially outer end portion of the shaft wall 13 is connected to an inner surface of the shaft tubular portion 11. Preferably, the shaft wall 13 is integrated with the shaft tubular portion 11. For example, the shaft wall 13 and the shaft tubular portion 11 are mutually different parts of the same member in the present preferred embodiment. Since the shaft wall 13 is integrated with the shaft tubular portion 11, the shaft 1 can be easily manufactured. In addition, the number of components of the shaft 1 can be reduced, and thus, the drive device 100 is easily assembled. However, the present invention is not limited to this example, and the shaft wall 13 may be a separate member from the shaft tubular portion 11.

The shaft wall 13 forms a shaft recess 14 together with the shaft tubular portion 11 at one axial end portion of the shaft 1. That is, the shaft 1 includes the shaft recess 14. The shaft recess 14 is recessed from the one axial end portion of the shaft 1 to the other axial side D2. In the present preferred embodiment, the shaft recess 14 accommodates at least the other axial side D2 of a first columnar portion 442. Further, the shaft recess 14 accommodates the conductive bearing 6 and the first seal member 81.

The first shaft through-hole 101 is arranged in the shaft tubular portion 11. That is, the shaft 1 further includes the first shaft through-hole 101 penetrating the shaft tubular portion 11 in the radial direction. The number of first shaft through-holes 101 may be one or plural. When the shaft 1 rotates, the fluid F in the shaft tubular portion 11 flows out from the hollow portion 12 to the outside of the shaft tubular portion 11 through the first shaft through-hole 101 by centrifugal force. In the present preferred embodiment, as illustrated in FIG. 1, the first shaft through-hole 101 is arranged on the one axial side D1 with respect to the other axial end portion of a rotor 21 and on the other axial side D2 with respect to one axial end portion of the rotor 21, and is connected to a rotor through-hole 2111 to be described later. However, the present invention is not limited to the example of FIG. 1, and the first shaft through-hole 101 may be arranged on the other axial side D2 with respect to the other axial end portion of the rotor 21 and on the one axial side D1 with respect to the first motor bearing 4211, and may be arranged on the one axial side D1 with respect to the one axial end portion of the rotor 21 and on the other axial side D2 with respect to the third motor bearing 4311. That is, at least a part of the first shaft through-hole 101 may be arranged in at least one of these positions. Note that the above-described example does not exclude a configuration in which the first shaft through-hole 101 and the rotor through-hole 2111 are omitted.

A second shaft through-hole 102 is arranged in the shaft tubular portion 11. The shaft 1 further includes the second shaft through-hole 102. The second shaft through-hole 102 penetrates the shaft tubular portion 11 in the radial direction. Alternatively, the second shaft through-hole 102 may penetrate the shaft tubular portion 11 in a direction intersecting the radial direction and the axial direction. Note that the second shaft through-hole 102 is an example of a "shaft through-hole" of the present invention.

The number of second shaft through-holes 102 may be one or plural. In the latter case, the second shaft through-holes 102 can be arranged at equal intervals or different intervals in the circumferential direction. Note that the above-described example does not exclude a configuration in which the second shaft through-hole 102 is omitted.

In the present preferred embodiment, the second shaft through-hole 102 is arranged at the one axial side D1 with respect to the first shaft through-hole 101 (see FIG. 1). A radially outer end portion of the second shaft through-hole 102 is connected to a third motor bearing holder 431. A radially inner end portion of the second shaft through-hole 102 is arranged on the other axial side D2 with respect to the shaft wall 13 and is connected to the hollow portion 12. Here, the fluid F can flow inside the shaft tubular portion 11. The fluid F is also supplied to the third motor bearing 4311 through the second shaft through-hole 102. For example, when the shaft 1 rotates, the fluid F flowing inside the shaft tubular portion 11 flows into the second shaft through-hole 102 by the centrifugal force. Therefore, for example, even if there is no electric oil pump (EOP), the fluid F can flow out from the second shaft through-hole 102 to the outside of the shaft 1. At least a part of the fluid F having flowed out can be supplied to the third motor bearing 4311.

Note that the other axial end portion of the shaft wall 13 is arranged on the other axial side D2 with respect to one axial end portion of an opening 4312 of the third motor bearing holder 431 to be described later in the present preferred embodiment. Alternatively, the other axial end portion of the shaft wall 13 may be at the same axial position as the one axial end portion of the opening 4312. Then, an interval between the radially inner end portion of the second shaft through-hole 102 and the shaft wall 13 in the axial direction can be further narrowed. Therefore, for example, the fluid F flowing inside the shaft tubular portion 11 toward the one axial side D1 easily flows to the second shaft through-hole 102, and the fluid F staying between the radially inner end portion of the second shaft through-hole 102 and the shaft wall 13 further decreases. Thus, the fluid F in the shaft tubular portion 11 can be more smoothly supplied to the third motor bearing 4311. However, the above-described example does not exclude a configuration in which the other axial end portion of the shaft wall 13 is arranged on the one axial side D1 with respect to the one axial end portion of the opening 4312.

The radially outer end portion of the second shaft through-hole 102 is arranged on the one axial side D1 with respect to the third motor bearing 4311. Preferably, the radially outer end portion of the second shaft through-hole 102 is arranged on the other axial side D2 with respect to the one axial end portion of the opening 4312, which will be described later, of a housing lid 43. More preferably, the radially outer end portion of the second shaft through-hole 102 is arranged on the other axial side D2 with respect to the second seal member 82. As described above, the radially outer end portion of the second shaft through-hole 102 is connected to the inside of the third motor bearing holder 431. For this reason, the fluid F hardly enters a space 403 to be described later in which the one axial end portion of the shaft tubular portion 11 is arranged as compared with a configuration in which the radially outer end portion of the second shaft through-hole 102 is arranged on the one axial side D1 with respect to the one axial end portion of the opening 4312 (that is, configuration in which the radially outer end portion of the second shaft through-hole 102 is connected to the outside of the third motor bearing holder 431). Therefore, it is possible to suppress the fluid F from being applied to the rotation detector 7 and the conductive bearing 6 in the shaft recess 14. Note that the above-described example does not exclude a configuration in which the radially outer end portion of the second shaft through-hole 102 is arranged on the one axial side D1 with respect to the one axial end portion of the opening 4312 or arranged on the one axial side D1 with respect to the second seal member 82.

The motor portion 2 is a DC brushless motor. The motor portion 2 is a drive source of the drive device 100, and is driven by power from an inverter (not illustrated). That is, the motor portion 2 is an inner rotor type motor in which the rotor 21 is rotatably arranged inward of the stator 22. As illustrated in FIG. 1, the motor portion 2 includes the rotor 21 and the stator 22.

The rotor 21 is supported by the shaft 1. The drive device 100 includes the rotor 21. The rotor 21 is fixed to the shaft 1 and is rotatable about the rotation axis J1. The rotor 21 rotates when electric power is supplied from a power source unit (not illustrated) of the drive device 100 to the stator 22. The rotor 21 includes a rotor core 211 and a magnet 212. The rotor core 211 is formed by, for example, laminating thin electromagnetic steel plates. The rotor core 211 is a cylindrical body extending along the axial direction, and is fixed to a radially outer surface of the shaft 1. A plurality of the magnets 212 are fixed to the rotor core 211. The plurality of magnets 212 are arranged along the circumferential direction with magnetic poles arranged alternately.

In addition, the rotor core 211 has the rotor through-hole 2111. The rotor through-hole 2111 penetrates the rotor core 211 in the axial direction and is connected to the first shaft through-hole 101. The rotor through-hole 2111 is used as a flow path of the fluid F that also functions as the refrigerant. When the rotor 21 rotates, the fluid F flowing through the hollow portion 12 of the shaft 1 can flow into the rotor through-hole 2111 via the first shaft through-hole 101. In addition, the fluid F flowing into the rotor through-hole 2111 can flow out from both axial end portions of the rotor through-hole 2111 to the outside. The fluid F having flowed out flies toward the stator 22 and cools, for example, a coil portion 222 (particularly, the coil end 2221 thereof) and the like. In addition, the fluid F having flowed out flies toward the first motor bearing 4211, the third motor bearing 4311, and the like that rotatably support the shaft 1, and lubricates and cools these bearings 4211 and 4311.

The stator 22 faces the rotor 21 with a gap therebetween in the radial direction. The drive device 100 includes the stator 22. The stator 22 is arranged radially outward of the rotor 21. The stator 22 includes a stator core 221 and the coil portion 222. The stator 22 is held by a first housing tubular portion 41 to be described later. The stator core 221 has a plurality of magnetic pole teeth (not illustrated) extending radially inward from an inner peripheral surface of an annular yoke. The coil portion 222 is formed by winding a conductive wire around the magnetic pole teeth via an insulator (not illustrated). The coil portion 222 has the coil end 2221 protruding from an axial end surface of the stator core 221.

Next, the gear portion 3 is a power transmission device that transmits power of the motor portion 2 to a drive shaft Ds to be described later. The gear portion 3 includes a deceleration device 31 and a differential device 32.

The deceleration device 31 is connected to the shaft 1. The deceleration device 31 has a function of reducing a rotation speed of the motor portion 2 and increasing torque output from the motor portion 2 according a reduction ratio. The deceleration device 31 transmits the torque output from the motor portion 2 to the differential device 32. That is, the gear portion 3 is connected to the one axial side D1 of the shaft 1 that rotates about the rotation axis J1 extending along the horizontal direction.

The deceleration device 31 includes a main drive gear 311, an intermediate driven gear 312, a final drive gear 313, and an intermediate shaft 314. The torque output from the motor portion 2 is transmitted to a ring gear 321 of the differential device 32 via the shaft 1, the main drive gear 311, the intermediate driven gear 312, the intermediate shaft 314, and the final drive gear 313.

The main drive gear 311 is arranged on an outer peripheral surface of the shaft 1. The main drive gear 311 may be the same member as the shaft 1, or may be a separate member and be firmly fixed. The main drive gear 311 rotates about the rotation axis J1 together with the shaft 1.

The intermediate shaft 314 extends along the intermediate axis J2 parallel to the rotation axis J1. Both ends of the intermediate shaft 314 are supported by a first intermediate bearing 4231 and a second intermediate bearing 4621 to be rotatable about an intermediate axis J2. The intermediate driven gear 312 and the final drive gear 313 are arranged on an outer peripheral surface of the intermediate shaft 314. The intermediate driven gear 312 may be the same member as the intermediate shaft 314, or may be a separate member and be firmly fixed thereto.

The intermediate driven gear 312 and the final drive gear 313 rotate integrally with the intermediate shaft 314 about the intermediate axis J2. The intermediate driven gear 312 meshes with the main drive gear 311. The final drive gear 313 meshes with the ring gear 321 of the differential device 32.

The torque of the shaft 1 is transmitted from the main drive gear 311 to the intermediate driven gear 312. Then, the torque transmitted to the intermediate driven gear 312 is transmitted to the final drive gear 313 through the intermediate shaft 314. Further, the torque is transmitted from the final drive gear 313 to the ring gear 321.

The differential device 32 is attached to the drive shaft Ds. The differential device 32 has the ring gear 321. The ring gear 321 transmits the torque transmitted from the deceleration device 31 to the drive shaft Ds. The drive shaft Ds is attached to each of the other axial side D2 and the one axial side D1 of the differential device 32. A drive shaft Ds1 on the one axial side D1 is rotatably supported by a first output bearing 4241 to be described later. A drive shaft Ds2 on the other axial side D2 is rotatably supported by a second output bearing 4631 to be described later. For example, the differential device 32 transmits the torque to the drive shafts Ds1 and Ds2 on both the axial sides while absorbing a rotation speed difference between the drive shafts Ds1 and Ds2 on both the axial sides when the vehicle turns.

A lower end portion of the ring gear 321 is arranged inside a liquid storage portion P to be described later in which the fluid F stored in a lower portion of a gear portion accommodation space 402 is stored (see FIG. 1). For this reason, the fluid F is scraped up by gear teeth of the ring gear 321 when a first gear 331 rotates. The gears and bearings of the gear portion 3 are lubricated or cooled by the fluid F scraped up by the ring gear 321. A part of the scraped fluid F is stored in a tray portion 464 to be described later, and is also used for cooling the motor portion 2 via the shaft 1.

The housing 4 accommodates the shaft 1, the motor portion 2, and the gear portion 3. The housing 4 includes the first housing tubular portion 41, a side plate 42, the housing lid 43, a cover member 44, a second housing tubular portion 45, and the gear lid 46. Note that the first housing tubular portion 41, the side plate 42, the housing lid 43, the cover member 44, the second housing tubular portion 45, and the gear lid 46 are formed using, for example, a conductive material, and in the present preferred embodiment, are formed using a metal material such as iron, aluminum, or an alloy thereof. In addition, these are preferably formed using the same material in order to suppress contact corrosion of dissimilar metals at the contact portion. However, the present invention is not limited to this example, and these may be formed using materials other than the metal materials, or at least a part of these may be formed using different materials.

In addition, the housing 4 accommodates the rotor 21 and the stator 22. In addition, the housing 4 includes the third motor bearing holder 431 that holds the third motor bearing 4311. Note that the third motor bearing holder 431 is an example of a "first bearing holder" of the present invention. As described above, the drive device 100 includes the housing 4. Specifically, the housing 4 has a motor accommodation space 401. The motor accommodation space 401 is a space surrounded by the first housing tubular portion 41, the side plate 42, and the housing lid 43, and accommodates the rotor 21, the stator 22, the first motor bearing 4211, the third motor bearing 4311, and the like.

In addition, the housing 4 accommodates the gear portion 3 as described above. Specifically, the housing 4 includes the gear portion accommodation space 402. The gear portion accommodation space 402 is a space surrounded by the side plate 42, the second housing tubular portion 45, and the gear lid 46, and accommodates the deceleration device 31, the differential device 32, and the like.

The liquid storage portion P in which the fluid F is stored is arranged in the lower portion in the gear portion accommodation space 402. A portion of the differential device 32 is immersed in the liquid storage portion P. The fluid F stored in the liquid storage portion P is scraped up by the operation of the differential device 32 and supplied to the inside of the gear portion accommodation space 402. That is, the fluid F is scraped up by a tooth surface of the ring gear 321 when the ring gear 321 of the differential device 32 rotates. A part of the scraped fluid F is supplied to the gears and the bearings of the deceleration device 31 and the differential device 32 in the gear portion accommodation space 402 and used for lubrication. In addition, the other part of the scraped fluid F is supplied to the inside of the shaft 1, and is supplied to the rotor 21 and the stator 22 of the motor portion 2 and the bearings in the gear portion accommodation space 402 to be used for cooling and lubrication.

The first housing tubular portion 41 has a tubular shape extending in the axial direction and surrounds the rotation axis J1. The first housing tubular portion 41 is an example of a "housing tubular portion" of the present invention. As described above, the housing 4 includes the first housing tubular portion 41. The motor portion 2, a fluid reservoir 54 to be described later, and the like are arranged inside the first housing tubular portion 41. In addition, the stator core 221 is fixed to an inner surface of the first housing tubular portion 41.

The side plate 42 covers the other axial end portion of the first housing tubular portion 41 and covers one axial end portion of the second housing tubular portion 45. The side plate 42 expands in a direction intersecting the rotation axis J1 and divides the first housing tubular portion 41 from the second housing tubular portion 45. In the present preferred embodiment, the first housing tubular portion 41 and the side plate 42 are different parts of the single member. Since these are integrally formed, the rigidity thereof can be enhanced. However, the present invention is not limited to this example, and both may be separate members.

The side plate 42 has a side plate through-hole 4201 through which the shaft 1 is inserted and a first drive shaft through-hole 4202. The side plate through-hole 4201 and the first drive shaft through-hole 4202 penetrates the side plate 42 in the axial direction. The center of the side plate through-hole 4201 coincides with the rotation axis J1. The shaft 1 is inserted through the side plate through-hole 4201. The center of the first drive shaft through-hole 4202 coincides with a drive axis J3. The drive shaft Ds1 on the one axial side D1 is inserted through the first drive shaft through-hole 4202. An oil seal (not illustrated) for sealing between the drive shaft Ds1 and the first drive shaft through-hole 4202 is arranged in a gap therebetween.

In addition, the side plate 42 further includes a first motor bearing holder 421, a second motor bearing holder 422, a first intermediate bearing holder 423, and a first output bearing holder 424. The first motor bearing holder 421 is arranged on the one axial side D1 of the side plate through-hole 4201 on the side plate 42 and holds the first motor bearing 4211. The second motor bearing holder 422 is arranged along an outer edge of the other axial end portion of the side plate through-hole 4201 and holds the second motor bearing 4221. The first intermediate bearing holder 423 is arranged on the other axial end surface of the side plate 42 and holds the first intermediate bearing 4231. The first output bearing holder 424 is arranged along an outer edge of the other axial end portion of the first drive shaft through-hole 4202 on the side plate 42, and holds the first output bearing 4241. The first motor bearing 4211, the second motor bearing 4221, the first intermediate bearing 4231, and the first output bearing 4241 are ball bearings in the present preferred embodiment.

The housing lid 43 expands in a direction intersecting the rotation axis J1 and covers one axial end portion of the first housing tubular portion 41. As described above, the housing 4 includes the housing lid 43. The housing lid 43 is arranged and attached to the one axial end portion of the first housing tubular portion 41. The housing lid 43 can be fixed to the first housing tubular portion 41 by, for example, a screw, but is not limited thereto, and a method of firmly fixing the housing lid 43 to the first housing tubular portion 41, such as screwing or press-fitting, can be widely adopted. As a result, the housing lid 43 can be brought into close contact with the one axial end portion of the first housing tubular portion 41. Note that the term "close contact" means to have such a sealing property to an extent that the fluid F inside the members does not leak to the outside and to an extent that foreign matter such as external water, dirt, or dust does not enter. It is assumed that the same is applied below for the close contact.

In addition, the housing lid 43 includes the third motor bearing holder 431. In other words, the drive device 100 includes the third motor bearing holder 431. The third motor bearing holder 431 is arranged on the other axial end surface of the housing lid 43. The third motor bearing holder 431 holds the third motor bearing 4311. The drive device 100 includes the third motor bearing 4311. The third motor bearing 4311 rotatably supports the shaft 1 and is lubricated by the fluid F. The third motor bearing 4311 is an example of a "first bearing" of the present invention, and is a ball bearing in the present preferred embodiment.

The third motor bearing holder 431 has the opening 4312 through which the shaft 1 is inserted. In other words, the housing lid 43 has the opening 4312 through which the shaft 1 is inserted. The opening 4312 penetrates the housing lid 43 in the axial direction and surrounds the rotation axis J1 when viewed from the axial direction.

In addition, the housing lid 43 further includes a detector holder 432 that holds the rotation detector 7. In the present preferred embodiment, the detector holder 432 is a step arranged on the one axial side D1 of the housing lid 43. This step has an annular shape surrounding the rotation axis J1.

The cover member 44 is arranged on one axial end surface of the housing lid 43 and covers the opening 4321. As described above, the housing 4 includes the cover member 44. The cover member 44 can be attached to the housing lid 43 by, for example, screwing, but is not limited thereto, and a method of firmly fixing the cover member 44 to the housing lid 43, such as screwing or press-fitting, can be widely adopted. In the present preferred embodiment, the cover member 44 forms the space 403 together with the housing lid 43. The space 403 is a space surrounded by the housing lid 43 and the cover member 44, and accommodates the one axial end portion of the shaft 1, the rotation detector 7, the second seal member 82, and the like.

The cover member 44 includes a plate portion 441 and the first columnar portion 442. The plate portion 441 has a plate shape expanding in a direction intersecting the rotation axis J1, and expands in the radial direction from the rotation axis J1 in the present preferred embodiment. The plate portion 441 is arranged on the one axial side D1 with respect to the one axial end portion of the shaft 1, and covers the opening 4312 and the one axial end portion of the shaft 1. The first columnar portion 442 extends in the axial direction along the rotation axis J1. The housing 4 has the first columnar portion 442. Specifically, the first columnar portion 442 extends from the plate portion 441 to the other axial side D2. The center of the first columnar portion 442 coincides with the rotation axis J1 when viewed from the axial direction. The other axial side D2 of the first columnar portion 442 is accommodated in the hollow portion 12 at the one axial end portion of the shaft tubular portion 11.

The second housing tubular portion 45 has a tubular shape surrounding the rotation axis J1 and extends in the axial direction. The one axial end portion of the second housing tubular portion 45 is connected to the sideplate 42 and covered with the side plate 42. In the present preferred embodiment, the second housing tubular portion 45 is detachably attached to the other axial end portion of the sideplate 42. In addition, the second housing tubular portion 45 can be attached to the side plate 42 by, for example, fixing with a screw, but is not limited thereto, and a method of firmly fixing the second housing tubular portion 45 to the sideplate 42, such as screwing or press-fitting, can be widely adopted. As a result, the second housing tubular portion 45 can be brought into close contact with the other axial end portion of the side plate 42.

The gear lid 46 expands in a direction intersecting the rotation axis J1. The gear portion 3 is arranged inside the second housing tubular portion 45 and the gear lid 46. In the present preferred embodiment, the second housing tubular portion 45 and the gear lid 46 are different parts of the single member. However, the present invention is not limited to this example, and the second housing tubular portion 45 and the gear lid 46 may be separate members.

The gear lid 46 includes a second drive shaft through-hole 460. The center of the second drive shaft through-hole 460 coincides with the drive axis J3. The drive shaft Ds is inserted through the second drive shaft through-hole 460. An oil seal (not illustrated) is arranged in a gap between the drive shaft Ds on the other axial side D2 and the second drive shaft through-hole 460.

The gear lid 46 further includes a fourth motor bearing holder 461, a second intermediate bearing holder 462, and a second output bearing holder 463. These bearing holders 461, 462, and 463 are arranged on one axial end surface of the gear lid 46 in the gear portion accommodation space 402. The fourth motor bearing holder 461 and the second intermediate bearing holder 462 are arranged on the one axial end surface of the gear lid 46. The fourth motor bearing holder 461 holds the fourth motor bearing 4611. The second intermediate bearing holder 462 holds the second intermediate bearing 4621. The second output bearing holder 463 is arranged along an outer edge of one axial end portion of the second drive shaft through-hole 460 in the gear lid 46, and holds the second output bearing 4631. The fourth motor bearing 4611, the second intermediate bearing 4621, and the second output bearing 4631 are ball bearings in the present preferred embodiment.

The gear lid 46 includes the tray portion 464 and the flow passage 465. The tray portion 464 is arranged in the one axial end surface of the gear lid 46 and has a recess recessed vertically downward. The tray portion 464 can store the fluid F scraped up by the ring gear 321. The flow passage 465 is a passage for the fluid F and connects the tray portion 464 and the inlet 111 of the shaft 1. The fluid F stored in the tray portion 464 is supplied to the flow passage 465 and flows into the hollow portion 12 from the inlet 111 at the other axial end portion of the shaft 1.

Next, the liquid circulation portion 5 will be described. The liquid circulation portion 5 includes a pipe 51, a pump 52, a cooler unit 53, and the fluid reservoir 54.

The pipe 51 connects the pump 52 and the fluid reservoir 54 arranged inside the first housing tubular portion 41, and supplies the fluid F to the fluid reservoir 54. The pump 52 sucks the fluid F stored in a lower region of the gear portion accommodation space 402. The pump 52 is an electric pump, but is not limited thereto. For example, the pump 52 may be configured to be driven by utilizing a part of the power of the shaft 1 of the drive device 100.

The cooler unit 53 is arranged between the pump 52 and the fluid reservoir 54 in the pipe 51. That is, the fluid F sucked by the pump 52 passes through the cooler unit 53 via the pipe 51 and then is sent to the fluid reservoir 54. For example, a refrigerant such as water supplied from the outside is supplied to the cooler unit 53. The cooler unit 53 exchanges heat between the refrigerant and the fluid F to lower the temperature of the fluid F.

The fluid reservoir 54 is a tray arranged vertically above the stator 22 inside the motor accommodation space 401. A dropping hole (whose reference sign is omitted) is formed at a bottom of the fluid reservoir 54, and the motor portion 2 is cooled by dropping the fluid F from the dropping hole. The dropping hole is formed above the coil end 2221 of the coil portion 222 of the stator 22, for example, and the coil portion 222 is cooled by the fluid F.

Next, the conductive bearing 6 will be described. The conductive bearing 6 is arranged between the shaft 1 and the housing 4 and rotatably supports the shaft 1. As described above, the drive device 100 includes the conductive bearing 6. The conductive bearing 6 is an example of a "second bearing" of the present invention in the present preferred embodiment, and is a ball bearing in the present preferred embodiment.

The conductive bearing 6 is lubricated by a lubricant 61 having a higher electrical conductivity than the fluid F. In the present preferred embodiment, conductive grease is used as the lubricant 61. In the conductive grease, a conductive material such as copper powder or carbon powder is added to a lubricating oil such as grease. The conductive bearing 6 can electrically connect the shaft tubular portion 11 and the first columnar portion 442 by the lubricant 61. For example, an inner ring and an outer ring of the ball bearing are electrically connected by the lubricant 61, and thus, the shaft tubular portion 11 is electrically connected to the first columnar portion 442 of the housing 4.

The conductive bearing 6 is arranged in a space isolated from the third motor bearing holder 431. In the present preferred embodiment, this space is the shaft recess 14. For example, the third motor bearing 4311 is lubricated by the fluid F having an electrical insulation property such as an automatic transmission fluid (ATF), so that it is possible to electrically insulate the shaft 1 from the housing 4 in the third motor bearing 4311 while securing the lubricity of the third motor bearing 4311. For example, when the third motor bearing 4311 is a ball bearing, an outer ring fixed to one of the shaft 1 and the housing 4 can be insulated from an inner ring fixed to the other of the shaft 1 and the housing 4. In addition, the conductive bearing 6 is arranged between the shaft 1 and the housing 4, and is lubricated by the lubricant 61 having electrical conductivity. Since the conductive bearing 6 is arranged in the space (the shaft recess 14 in the present preferred embodiment) isolated from the third motor bearing holder 431, the fluid F for lubricating and cooling the stator 22, the third motor bearing 4311, and the like is hardly applied to the conductive bearing 6. Therefore, it is possible to prevent the fluid F from mixing with the lubricant 61, and thus, it is possible to prevent deterioration in the electrical conductivity of the lubricant 61. Therefore, the conductive bearing 6 can favorably maintain the electrical connection between the shaft 1 and the first columnar portion 442 of the housing 4. Therefore, a current generated by potential fluctuations occurring in the shaft 1 can be sufficiently discharged to the housing 4 via the conductive bearing 6.

The conductive bearing 6 is arranged to be coaxial with the third motor bearing 4311. For example, the both have an annular shape centered on the same axis (that is, the rotation axis J1). Then, the conductive bearing 6 can rotatably support the shaft 1 more stably together with the third motor bearing 4311.

In the present preferred embodiment, the conductive bearing 6 is fitted to the shaft recess 14. For example, a radially outer end portion of the conductive bearing 6 (for example, the outer ring of the ball bearing) is fitted to and contacts an inner peripheral surface of the shaft recess 14. A radially inner end portion of the conductive bearing 6 (for example, the inner ring of the ball bearing) contacts a radially outer surface of the first columnar portion 442. Then, since the conductive bearing 6 is fitted and held in the shaft recess 14, it is unnecessary to secure a space for arranging the conductive bearing 6 and a bearing holder for holding the conductive bearing 6 outside the shaft 1. Therefore, the drive device 100 can be downsized. However, the present invention is not limited to this example, and the conductive bearing 6 may be fixed to the shaft recess 14 by means (welding, brazing, or the like) other than the above-described fitting structure.

The conductive bearing 6 is arranged on the one axial side D1 with respect to the shaft wall 13 inside the shaft tubular portion 11. The second shaft through-hole 102 is arranged on the other axial side D2 with respect to the shaft wall 13. Then, a space through which the fluid F in the shaft tubular portion 11 flows can be isolated from the space in which the conductive bearing 6 is arranged by the shaft wall 13. For example, the hollow portion 12 in the shaft tubular portion 11 can be partitioned into a space on the other axial side D2 of the shaft wall 13 in the hollow portion 12, and the shaft recess 14. The fluid F flows in the former, and the conductive bearing 6 is arranged in the latter. Therefore, it is possible to prevent the fluid F from being directly applied to the conductive bearing 6.

The rotation detector 7 is attached to the one axial side D1 of the housing lid 43. The rotation detector 7 is arranged on the one axial side D1 with respect to the third motor bearing holder 431, and detects a rotation angle of the shaft 1. In the present preferred embodiment, the rotation detector 7 is a resolver including a resolver rotor and a resolver stator. The rotation detector 7 includes the resolver rotor (not illustrated) fixed to the shaft 1 and the resolver stator (not illustrated) fixed to the housing lid 43 of the housing 4. The resolver rotor and the resolver stator have an annular shape. An inner peripheral surface of the resolver stator radially faces an outer peripheral surface of the resolver rotor. The resolver stator periodically detects a rotation angle position of the resolver rotor when the rotor 21 rotates. As a result, the rotation detector 7 acquires information on the rotation angle position of the rotor 21. Note that the present invention is not limited to the example of the present preferred embodiment, and the rotation detector 7 is not necessarily the resolver, and may be, for example, a rotary encoder or the like.

The first seal member 81 is arranged on the one axial side D1 with respect to the conductive bearing 6 in the shaft tubular portion 11. In the present preferred embodiment, the shaft 1 includes the first seal member 81. The first seal member 81 has an annular shape surrounding the rotation axis J1. In the present preferred embodiment, the first seal member 81 is fixed to the radially outer surface of the first columnar portion 442 and expands radially outward (see FIG. 2). However, the present invention is not limited to this example, and the first seal member 81 may be fixed to the inner peripheral surface of the shaft tubular portion 11 and may expand radially inward. That is, it is sufficient for the first seal member 81 to be fixed to one of the inner peripheral surface of the shaft tubular portion 11 and the radially outer surface of the first columnar portion 442, and to expand from the one to the other in the radial direction.

Then, a gap between the inner peripheral surface of the shaft tubular portion 11 and the radially outer surface of the first columnar portion 442 can be covered by the first seal member 81 expanding in the radial direction at a position on the one axial side D1 of the conductive bearing 6 in the shaft tubular portion 11. Here, for example, mist of the fluid F for lubricating and cooling the respective portions of the drive device 100 may enter the shaft tubular portion 11 at the one axial end portion of the shaft 1. Even if the fluid F enters, the fluid F can be suppressed or prevented from entering from the one axial side D1 to the other axial side D2 of the first seal member 81. Therefore, it is possible to effectively suppress or prevent the fluid F from being applied to the conductive bearing 6.

In the present preferred embodiment, the first seal member 81 is a slinger having a fixed portion (whose reference sign is omitted) and a flange portion (whose reference sign is omitted). The fixed portion of the slinger has a tubular shape extending in the axial direction. The flange portion has a plate shape expanding in the radial direction from the fixed portion, and covers the gap between the shaft tubular portion 11 and the first columnar portion 442 in the radial direction. However, the first seal member 81 is not limited to this example. As the first seal member 81, an oil seal, a mechanical seal, a packing, or the like may be used.

The second seal member 82 is arranged radially outward of the shaft 1. As described above, the drive device 100 further includes the second seal member 82. The second seal member 82 is arranged between the third motor bearing 4311 and the one axial end portion of the shaft 1 in the axial direction. Specifically, the second seal member 82 has an annular shape surrounding the rotation axis J1 and covers a gap between the shaft 1 and the housing lid 43 (in other words, an inner peripheral surface of the opening 4312). Then, since the third motor bearing holder 431 is partitioned by the second seal member 82, it is possible to suppress or prevent the fluid F for lubricating the third motor bearing 4311 from being applied to the conductive bearing 6. Therefore, it is possible to suppress deterioration in electrical conductivity in the conductive bearing 6.

Preferably, the second seal member 82 is arranged between the third motor bearing 4311 and the rotation detector 7 in the axial direction. The second seal member 82 divides the third motor bearing holder 431 from the space 403 in which the rotation detector 7 is arranged. Then, the second seal member 82 can suppress or prevent the fluid F for lubricating the third motor bearing 4311 from being applied to the rotation detector 7. Note that this example does not exclude a configuration in which the second seal member 82 is arranged on the one axial side D1 with respect to the rotation detector 7.

In the present preferred embodiment, the second seal member 82 is arranged outside the one axial end portion of the opening 4312. However, the arrangement of the second seal member 82 is not limited to the example of the present preferred embodiment. For example, the second seal member 82 may be arranged inside the opening 4312. Preferably, the second seal member 82 is arranged on the one axial side D1 with respect to the radially outer end portion of the second shaft through-hole 102. Then, it is possible to suppress or prevent the fluid F flowing out from the second shaft through-hole 102 from being applied to the rotation detector 7. However, this example does not exclude a configuration in which the second seal member 82 is arranged on the other axial side D2 with respect to the radially outer end portion of the second shaft through-hole 102.

In the present preferred embodiment, the second seal member 82 is a slinger having a fixed portion (whose reference sign is omitted) and a flange portion (whose reference sign is omitted). The fixed portion of the slinger has a tubular shape extending in the axial direction. The flange portion has a plate shape expanding in the radial direction from the fixed portion, and covers a gap between the shaft tubular portion 11 and the housing lid 43 (the inner peripheral surface of the opening 4312) in the radial direction. However, the second seal member 82 is not limited to this example. As the second seal member 82, an oil seal, a mechanical seal, a packing, or the like may be used. Alternatively, the second seal member 82 may be a part of the third motor bearing 4311. That is, the third motor bearing 4311 may be a seal-type ball bearing including the second seal member 82. Alternatively, the second seal member 82 may be a part of the conductive bearing 6. That is, the conductive bearing 6 may be a seal-type ball bearing including the second seal member 82 and the lubricant 61.

Figure 4:
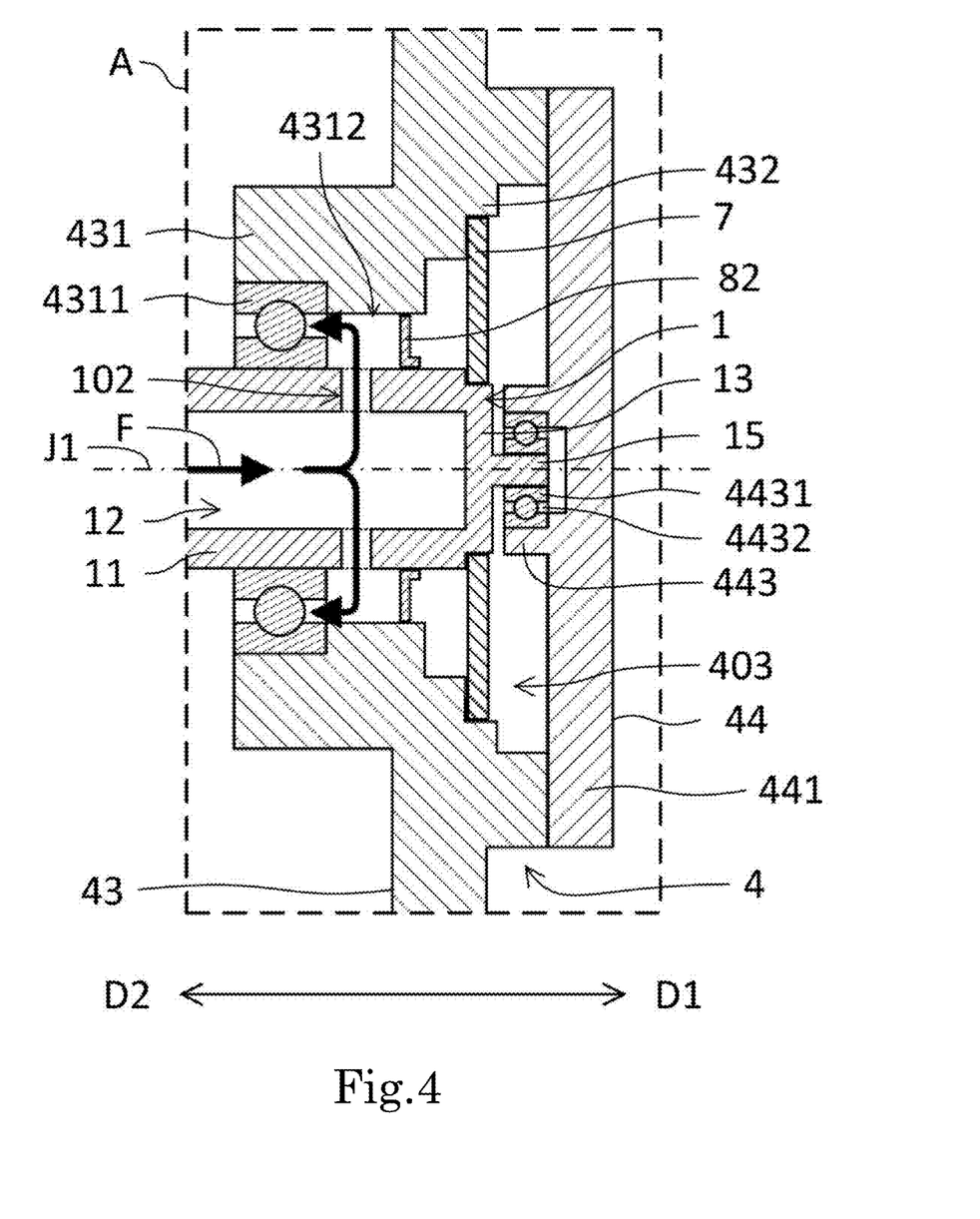
FIG. 4 is a conceptual diagram illustrating an example of a shaft neutralizing structure of a drive device according to a first modification.
Figure 5:
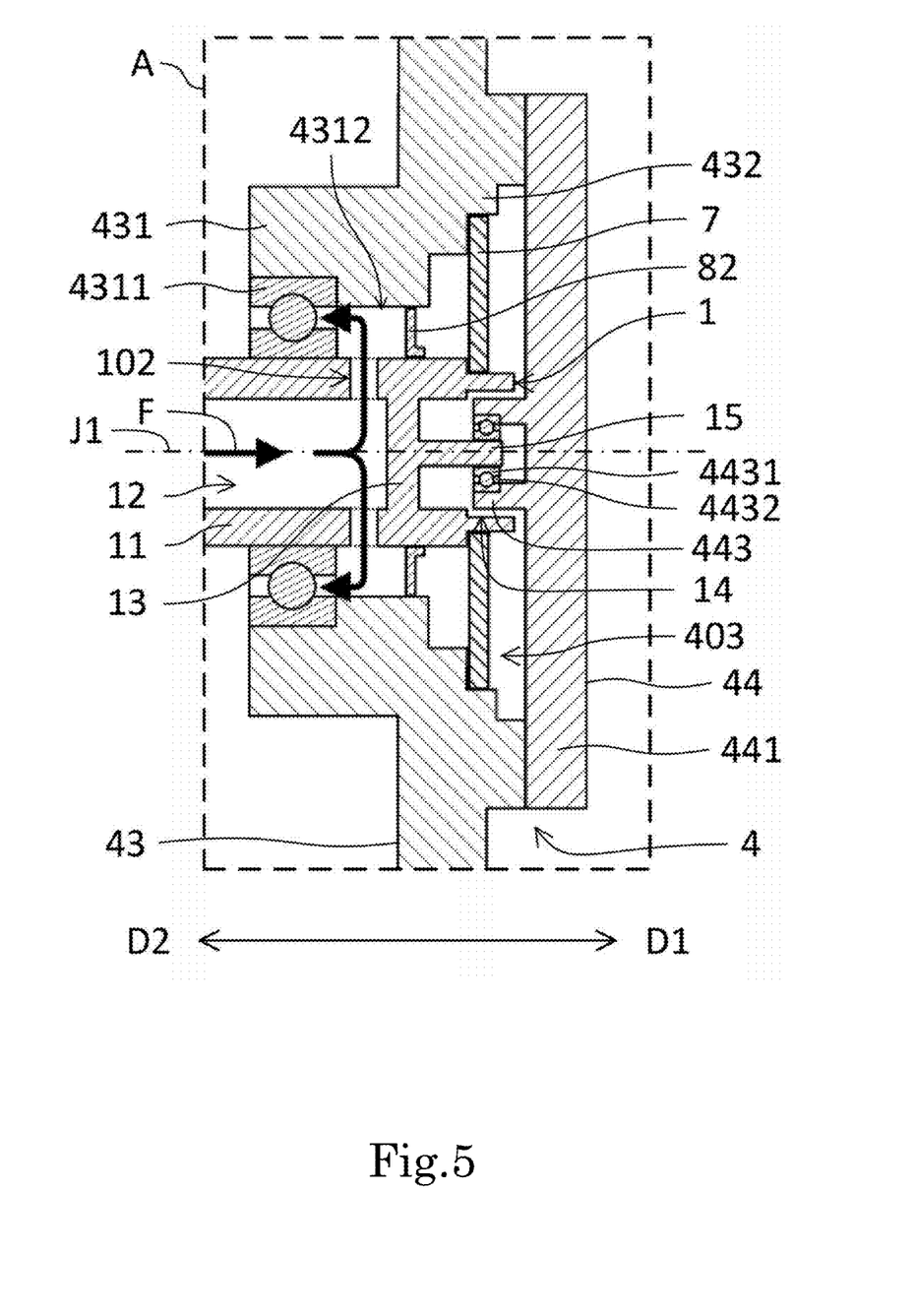
FIG. 5 is a conceptual diagram illustrating another example of the shaft neutralizing structure of the drive device according to the first modification.

Next, a first modification of the preferred embodiment will be described with reference to FIGS. 4 and 5. FIG. 4 is a conceptual diagram illustrating an example of a shaft neutralizing structure according to a first modification. FIG. 5 is a conceptual diagram illustrating another example of the shaft neutralizing structure according to the first modification. Note that FIGS. 4 and 5 are merely conceptual diagrams, and a layout and a dimension of each portion are not necessarily identical to those of the actual drive device 100 in a strict sense. FIGS. 4 and 5 correspond to a portion A surrounded by a broken line in FIG. 1. Hereinafter, a configuration different from that of the above preferred embodiment will be described. In addition, the same components as those in the above-described preferred embodiment are denoted by the same reference signs, and the description thereof may be omitted.

In the first modification, the drive device 100 includes a second columnar portion 15, a conductive bearing holder 443, and a conductive bearing 4431, instead of the first columnar portion 442 and the conductive bearing 6 (see FIG. 2). Specifically, the shaft 1 includes the second columnar portion 15. The second columnar portion 15 extends from the shaft wall 13 to the one axial side D1 along the rotation axis J1. The center of the second columnar portion 15 coincides with the rotation axis J1 when viewed from the axial direction. The one axial side D1 of the second columnar portion 15 is accommodated in the conductive bearing holder 443. In addition, the cover member 44 includes the plate portion 441. The cover member 44 further includes the conductive bearing holder 443 that holds the conductive bearing 4431. The conductive bearing 4431 rotatably supports the second columnar portion 15. The conductive bearing 4431 is an example of a "second bearing" of the present invention in the first modification, and is a ball bearing having the same configuration as the conductive bearing of the preferred embodiment. For example, the conductive bearing 4431 is lubricated by a lubricant 4432 having a higher electrical conductivity than the fluid F. The conductive bearing holder 443 is arranged on the other axial end surface of the plate portion 441. The center of the conductive bearing holder 443 coincides with the rotation axis J1 when viewed from the axial direction.

According to the first modification, a space through which the fluid F in the shaft tubular portion 11 flows can be isolated from the space 403 in which the conductive bearing 4431 is arranged by the shaft wall 13. Note that the former space is the hollow portion 12 in FIG. 4, and is located on the other axial side D2 with respect to the shaft wall 13 of the hollow portion 12 in FIG. 5. For example, the fluid F can be prevented from flowing out from the one axial end portion of the shaft tubular portion 11 to the outside of the shaft 1 by closing the one axial end portion of the shaft tubular portion 11 with the shaft wall 13. Therefore, it is possible to prevent the fluid F from being applied to the conductive bearing 4431.

In addition, the conductive bearing 4431 that rotatably supports the second columnar portion 15 is held by the conductive bearing holder 443 of the cover member 44, and thus, a current generated by potential fluctuations occurring in the shaft 1 can be discharged to the cover member 44 of the housing 4 via the second columnar portion 15, the conductive bearing 4431, and the conductive bearing holder 443.

Note that the shaft wall 13 is arranged at the one axial end portion of the shaft tubular portion 11 in FIG. 4. For this reason, the shaft 1 does not have the shaft recess 14 (see FIG. 2). However, the present invention is not limited to the example of FIG. 4, and the shaft 1 may have the shaft recess 14. For example, as illustrated in FIG. 5, the shaft wall 13 may be arranged on the other axial side D2 with respect to the one axial end portion of the shaft tubular portion 11 on the one axial side D1 of the shaft tubular portion 11. Further, at least the other axial side D2 of the conductive bearing holder 443 may be accommodated inside the shaft tubular portion 11, and is accommodated in the shaft recess 14 in FIG. 5. Then, it is unnecessary to secure a space for arranging the conductive bearing 4431 and the conductive bearing holder 443 outside the shaft 1 (particularly, on the one axial side D1 of the shaft tubular portion 11). Therefore, it is possible to suppress an increase in axial size of the drive device 100, and thus, it is possible to contribute to downsizing of the drive device 100.

Figure 6:
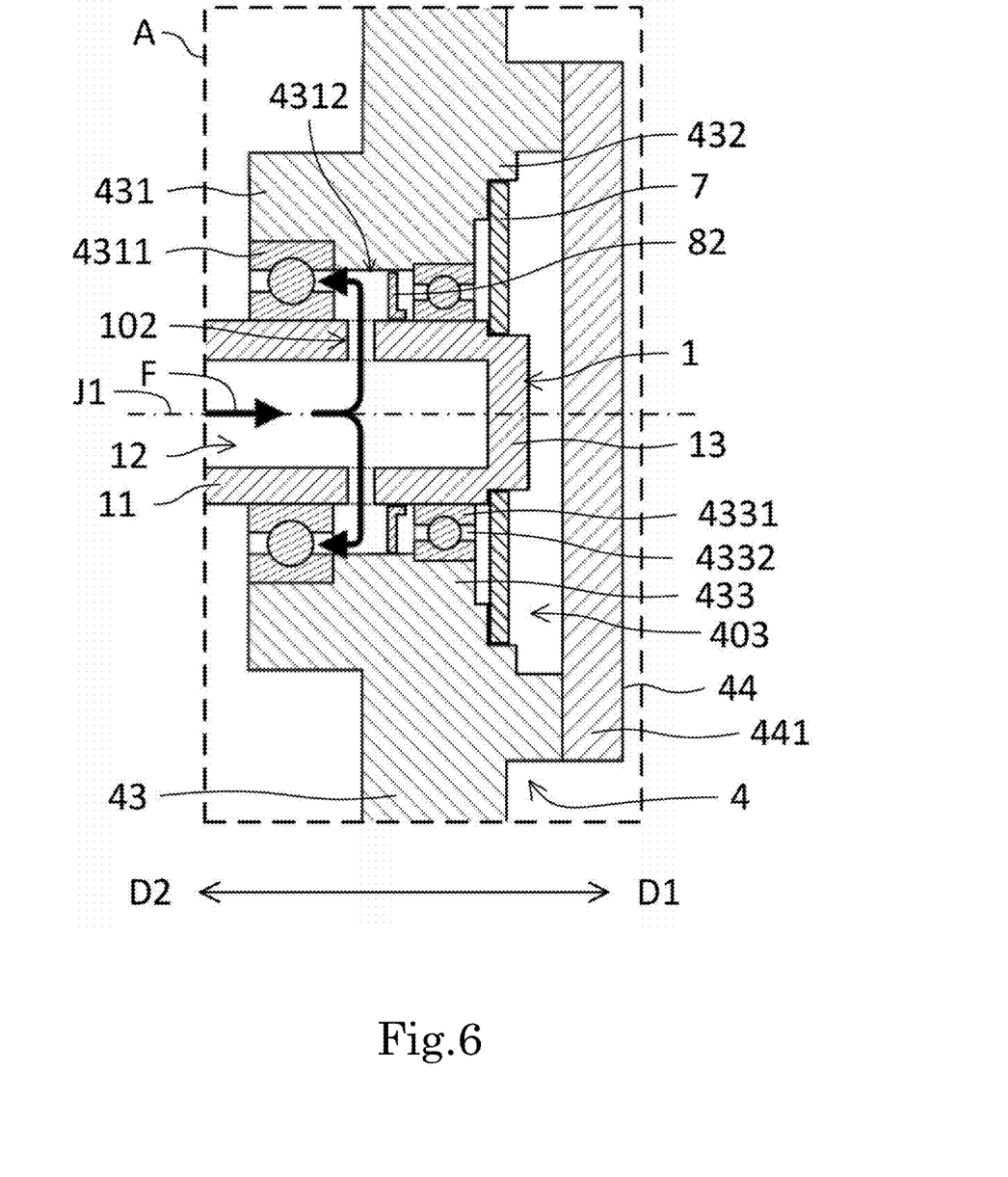
FIG. 6 is a conceptual diagram illustrating an example of a shaft neutralizing structure of a drive device according to a second modification.

Next, a second modification of the preferred embodiment will be described with reference to FIG. 6. FIG. 6 is a conceptual diagram illustrating an example of a shaft neutralizing structure according to a second modification. Note that FIG. 6 is a merely conceptual diagram, and a layout and a dimension of each portion are not necessarily identical to those of the actual drive device 100 in a strict sense. FIG. 6 corresponds to the portion A surrounded by the broken line in FIG. 1. Hereinafter, a configuration different from that of the above preferred embodiment and the first modification will be described. In addition, the same components as those in the above-described preferred embodiment and first modification are denoted by the same reference signs, and the description thereof may be omitted.

In the second modification, the drive device 100 includes a conductive bearing 4331 and a conductive bearing holder 433, instead of the first columnar portion 442 and the conductive bearing 6 (see FIG. 2) of the preferred embodiment, the second columnar portion 15, the conductive bearing holder 443, and the conductive bearing 4431 of the first modification (see FIGS. 4 and 5), and the like. Specifically, the conductive bearing 4331 is arranged on the radially outer surface of the shaft 1 together with the third motor bearing 4311. In the second modification, the conductive bearing 4331 is an example of a "second bearing" of the present invention, and is a ball bearing having the same configuration as the conductive bearing 6 of the preferred embodiment. For example, the conductive bearing 4331 is lubricated by a lubricant 4332 having a higher electrical conductivity than the fluid F. The conductive bearing 4331 is arranged on the one axial side D1 with respect to the third motor bearing 4311. The conductive bearing holder 433 holds the conductive bearing 4331. The housing 4 further includes the conductive bearing holder 433. In the second modification, the conductive bearing holder 433 is an example of a "second bearing holder" of the present invention. The center of the conductive bearing holder 443 coincides with the rotation axis J1 when viewed from the axial direction.

In FIG. 6, the conductive bearing 4331 is arranged on the one axial side D1 of the opening 4312. A radially inner end portion (for example, an inner ring) of the conductive bearing 4331 is fixed to the outer peripheral surface of the shaft tubular portion 11. A radially outer end portion (for example, an outer ring) of the conductive bearing 4331 is fixed to the inner peripheral surface of the opening 4312 of the housing lid 43. That is, in FIG. 6, the conductive bearing holder 433 is a portion along an outer edge of the one axial end portion of the opening 4312 of the housing lid 43. However, the present invention is not limited to the example of FIG. 6, and the conductive bearing holder 433 may be arranged on the one axial end surface of the housing lid 43 outside the opening 4312.

In the second modification, the second seal member 82 is preferably arranged between the third motor bearing 4311 and the conductive bearing 4331 in the axial direction to divide the third motor bearing holder 431 from the conductive bearing holder 433 as illustrated in FIG. 6. Then, by dividing the third motor bearing holder 431 from the conductive bearing holder 433 with the second seal member 82, it is possible to suppress or prevent the fluid F for lubricating the third motor bearing holder 431 from being applied to the conductive bearing holder 433. Therefore, it is possible to suppress deterioration in electrical conductivity in the conductive bearing holder 433. Since the third motor bearing holder 431 and the conductive bearing holder 433 are arranged on the radially outer surface of the shaft 1, the conductive bearing holder 433 having electrical conductivity can be arranged near the third motor bearing 4311. Therefore, it is possible to more effectively suppress or prevent the electrical conduction in the third motor bearing holder 431 lubricated by the fluid F having an electrical insulation property. For example, discharge between an inner ring and an outer ring of a ball bearing can be effectively suppressed or prevented.

The preferred embodiment of the present invention has been described above. Note that the scope of the present invention is not limited to the above-described preferred embodiment. The present invention can be implemented by making various modifications to the above-described preferred embodiment within a range not departing from the gist of the invention. In addition, the matters described in the above-described preferred embodiment can be arbitrarily combined together as appropriate within a range where no inconsistency occurs.

The present invention is useful for a device that grounds a rotatable shaft. In addition, the present invention is useful for a motor mounted on a vehicle, and is also useful for motors used for applications other than in-vehicle applications.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A drive device comprising:
a shaft extending in an axial direction along a rotation axis;
a rotor fixed to the shaft and rotatable about the rotation axis;
a stator facing the rotor in a radial direction with a gap between the stator and the rotor;
a first bearing that rotatably supports the shaft and is lubricated by a fluid;
a housing that includes a first bearing holder holding the first bearing and accommodates the rotor and the stator; and
a second bearing that is arranged between the shaft and the housing, rotatably supports the shaft, and is lubricated by a lubricant having a higher electrical conductivity than the fluid,
wherein the second bearing is arranged in a space isolated from the first bearing holder, wherein
the housing includes a first columnar portion extending in the axial direction along the rotation axis,
the shaft includes a shaft recess recessed from one axial end portion to another axial end portion of the shaft,
the shaft recess accommodates at least another axial side of the first columnar portion,
the second bearing is fitted to the shaft recess, and
a radially inner end portion of the second bearing contacts a radially outer surface of the first columnar portion.

2. The drive device according to claim 1, wherein the second bearing is arranged to be coaxial with the first bearing.

3. The drive device according to claim 1, wherein
the shaft further includes a first seal member arranged on one axial side of the second bearing in a shaft tubular portion, and
the first seal member is fixed to one of an inner peripheral surface of the shaft tubular portion and the radially outer surface of the first columnar portion, and expands from the one toward another in the radial direction.

4. The drive device according to claim 1, wherein
the shaft includes
a shaft tubular portion surrounding the rotation axis, and
a shaft through-hole penetrating the shaft tubular portion in the radial direction or in a direction intersecting the radial direction and the axial direction, and
the fluid is able to flow inside the shaft tubular portion and is supplied to the first bearing through the shaft through-hole.

5. The drive device according to claim 4, wherein
the shaft further includes a shaft wall that is arranged inside the shaft tubular portion and expands in the radial direction,
a radially outer end portion of the shaft wall is connected to an inner peripheral surface of the shaft tubular portion,
the second bearing is arranged on one axial side of the shaft wall inside the shaft tubular portion, and
the shaft through-hole is arranged on another axial side of the shaft wall.

6. The drive device according to claim 1, wherein
the housing includes
a housing tubular portion that extends in the axial direction and surrounds the rotation axis,
a housing lid that has an opening through which the shaft is inserted and is arranged at one axial end portion of the housing tubular portion, and
a cover member that is arranged at one axial end portion of the housing lid and covers the opening,
the shaft includes
a shaft tubular portion that surrounds the rotation axis and is rotatably supported by the first bearing,
a shaft wall that is arranged on one axial side of the shaft tubular portion and expands in the radial direction, and
a second columnar portion extending from the shaft wall to the one axial side,
the cover member includes a second bearing holder holding the second bearing, and
the second bearing rotatably supports the second columnar portion.

7. The drive device according to claim 6, wherein at least another axial side of the second bearing holder is accommodated inside the shaft tubular portion.

8. The drive device according to claim 1, further comprising a second seal member arranged radially outward of the shaft and between the first bearing and one axial end portion of the shaft in the axial direction.

9. The drive device according to claim 1, further comprising a second seal member arranged radially outward of the shaft,
- wherein the second bearing is arranged on a radially outer surface of the shaft together with the first bearing,
- the housing further includes a second bearing holder holding the second bearing, and
- the second seal member is arranged between the first bearing and the second bearing in the axial direction and divides the first bearing holder from the second bearing holder.

10. A vehicle comprising the drive device according to claim 1.

11. A drive device comprising:
- a shaft extending in an axial direction along a rotation axis;
- a rotor fixed to the shaft and rotatable about the rotation axis;
- a stator facing the rotor in a radial direction with a gap between the stator and the rotor;
- a first bearing that rotatably supports the shaft and is lubricated by a fluid;
- a housing that includes a first bearing holder holding the first bearing and accommodates the rotor and the stator; and
- a second bearing that is arranged between the shaft and the housing, rotatably supports the shaft, and is lubricated by a lubricant having a higher electrical conductivity than the fluid,
- wherein the second bearing is arranged in a space isolated from the first bearing holder, wherein
- the shaft includes:
  - a shaft tubular portion surrounding the rotation axis,
  - a shaft through-hole penetrating the shaft tubular portion in the radial direction or in a direction intersecting the radial direction and the axial direction,
  - the fluid is able to flow inside the shaft tubular portion and is supplied to the first bearing through the shaft through-hole,
  - a shaft wall that is arranged inside the shaft tubular portion and expands in the radial direction,
  - a radially outer end portion of the shaft wall is connected to an inner peripheral surface of the shaft tubular portion,
  - the second bearing is arranged on one axial side of the shaft wall inside the shaft tubular portion, and
  - the shaft through-hole is arranged on another axial side of the shaft wall.

12. A vehicle comprising the drive device according to claim 11.

13. A drive device comprising:
- a shaft extending in an axial direction along a rotation axis;
- a rotor fixed to the shaft and rotatable about the rotation axis;
- a stator facing the rotor in a radial direction with a gap between the stator and the rotor;
- a first bearing that rotatably supports the shaft and is lubricated by a fluid;
- a housing that includes a first bearing holder holding the first bearing and accommodates the rotor and the stator; and
- a second bearing that is arranged between the shaft and the housing, rotatably supports the shaft, and is lubricated by a lubricant having a higher electrical conductivity than the fluid,
- wherein the second bearing is arranged in a space isolated from the first bearing holder, wherein
- the housing includes
  - a housing tubular portion that extends in the axial direction and surrounds the rotation axis,
  - a housing lid that has an opening through which the shaft is inserted and is arranged at one axial end portion of the housing tubular portion, and
  - a cover member that is arranged at one axial end portion of the housing lid and covers the opening,
- the shaft includes
  - a shaft tubular portion that surrounds the rotation axis and is rotatably supported by the first bearing,
  - a shaft wall that is arranged on one axial side of the shaft tubular portion and expands in the radial direction, and
  - a second columnar portion extending from the shaft wall to the one axial side,
- the cover member includes a second bearing holder holding the second bearing, and
- the second bearing rotatably supports the second columnar portion.

14. A vehicle comprising the drive device according to claim 13.

15. A drive device comprising:
- a shaft extending in an axial direction along a rotation axis;
- a rotor fixed to the shaft and rotatable about the rotation axis;
- a stator facing the rotor in a radial direction with a gap between the stator and the rotor;
- a first bearing that rotatably supports the shaft and is lubricated by a fluid;
- a housing that includes a first bearing holder holding the first bearing and accommodates the rotor and the stator; and
- a second bearing that is arranged between the shaft and the housing, rotatably supports the shaft, and is lubricated by a lubricant having a higher electrical conductivity than the fluid,
- wherein the second bearing is arranged in a space isolated from the first bearing holder,
- the shaft is provided facing the first bearing holder with a gap between in the radial direction,
- the second seal member is arranged between the outer peripheral surface of the shaft and the inner peripheral surface of the first bearing holder, and
- the second seal member is arranged between the first bearing and one axial end portion of the shaft in the axial direction.

16. A vehicle comprising the drive device according to claim 15.

* * * * *